United States Patent
Reinbold (10) Patent No.: US 7,266,680 B1
(45) Date of Patent: Sep. 4, 2007

(54) METHOD AND APPARATUS FOR LOADING CONFIGURATION DATA

(75) Inventor: Lukas Reinbold, Oberkirch-Stadelhofen (DE)

(73) Assignee: Marvell International Ltd., Hamilton (BM)

( * ) Notice: Subject to any disclaimer, the term of this patent is extended or adjusted under 35 U.S.C. 154(b) by 476 days.

(21) Appl. No.: 10/901,689

(22) Filed: Jul. 29, 2004

(51) Int. Cl.
G06F 9/22 (2006.01)
G06F 9/24 (2006.01)
G06F 11/16 (2006.01)

(52) U.S. Cl. .............................. 713/100; 713/1; 713/2; 714/3; 714/23

(58) Field of Classification Search ...................... None
See application file for complete search history.

(56) References Cited

U.S. PATENT DOCUMENTS

| | | | |
|---|---|---|---|
| 4,868,783 A * | 9/1989 | Anderson et al. ........... 710/104 |
| 6,076,160 A * | 6/2000 | Wisor ............................. 713/1 |
| 6,119,157 A | 9/2000 | Traversat et al. ........... 709/220 |
| 6,587,124 B1 | 7/2003 | Slaby ......................... 345/735 |
| 6,611,912 B1 | 8/2003 | Maleck et al. .............. 713/100 |
| 6,640,262 B1 | 10/2003 | Uppunda et al. ............. 710/10 |
| 6,665,766 B1 | 12/2003 | Guccione et al. ........... 710/305 |
| 2003/0177344 A1 | 9/2003 | Harvey, IV .................... 713/1 |
| 2003/0204574 A1 | 10/2003 | Kupershmidt ............... 709/220 |
| 2005/0086456 A1* | 4/2005 | Elboim et al. ................. 713/1 |

* cited by examiner

Primary Examiner—James K. Trujillo (57) ABSTRACT

A system is provided for configuring a configurable device. The system includes an internal bus in communication with registers and to a configuration circuit. The configuration circuit may include its own registers. The configuration circuit tests a content of at least one of the registers and performs an operation in accordance with the result of the test.

88 Claims, 7 Drawing Sheets

| LOAD OPCODE | DESCRIPTION |
| --- | --- |
| 0x0 | WRITE CONFIGURATION DATA |
| 0x1 | RESERVED |
| 0x2 | READ UNTIL ALL RELEVANT BITS ARE '0' |
| 0x3 | READ UNTIL ALL RELEVANT BITS ARE '1' |
| 0x4 | READ UNTIL ONE RELEVANT BIT IS '1' |
| 0x5 | READ UNTIL ONE RELEVANT BIT IS '0' |
| 0x6 | TEST WHETHER RELEVANT BIT IS '0' |
| 0x7 | TEST WHETHER RELEVANT BIT IS '1' |

METHOD AND APPARATUS FOR LOADING CONFIGURATION DATA

BACKGROUND OF THE INVENTION

1. Field of the Invention

The present invention relates to programmable hardware devices, and in particular to hardware configuration loaders.

2. Description of Related Art

Bus-master devices such as network adaptors typically are equipped with their own processor and on-board programming. A bus-master device can thus carry out certain operations without requiring processing from an outside system CPU such as that of a PC. The device typically includes configurable memory registers for storing data that affect the behavior of the device. Such registers allow the device to be adapted for different applications.

Data can be loaded (e.g., transferred) from an external device to a receiving device's memory via an electrical connection such as a common bus or network connection. Typically, loading occurs upon system initialization and involves identifying physical memory addresses in the device and the size and direction of data transfer before the transfer is made.

Examples of other types of devices that require configuration are peripheral devices such as printers, disk drives and keyboards. These devices have driver programs that translate communications between the device and external devices such as programmable CPUs. The external programs cause a device to perform relevant functions including management functions such as waking up the device, initiating a boot process or loading up an operating system. Each device has its own set of specialized commands that only its driver knows. Many drivers come with the operating system of the device. For other devices, a driver may have to be loaded when the device is connected to the system.

Specific integrated circuit (IC) devices exist whose functionality can be substantially modified by changing on-chip functions or the connectivity between these functions. Application specific integrated circuits ("ASICs"), for example, are a type of IC device designed to perform a particular function by defining the interconnection of a set of basic circuit building blocks drawn from a library provided by the circuit manufacturer. Such devices include registers that can be loaded automatically with configuration data that affects the behavior of the circuit.

Configuration data can be loaded without the aid of the device's on-board processor by using a state machine which can read the commands and data. U.S. Pat. No. 6,640,262 describes a configuration loader which loads data including configuration data to a configurable integrated circuit upon initialization of a system in which a configurable integrated circuit is embedded. Commands and data elements are stored in non-volatile memory. If the initial address contains a command, depending upon the type of command, the contents of a next address in the non-volatile memory are written to a register space of the configurable integrated circuit, to a configuration space of the configurable integrated circuit, or to a command space of the configurable integrated circuit.

A disadvantage of this scheme is that it is limited by the manner in which commands and data elements are stored in non-volatile memory. The non-volatile memory is sequentially accessed without the capability of conditionally modifying the access sequence. For example, the above-described method cannot test the destination register (or some other register) first and modify the loading sequence in accordance with the result of the test.

System designers want virtually unlimited choices in core architectures, and the ability to customize several features to suit the application and design constraints at hand. This would allow designers to tune the device's instruction set architecture to the application's characteristics. The resulting device would remain programmable and, in principle, can run any application, but is optimized for a targeted application domain.

Accordingly, there is a need to control memory or register configuration without limitations to achieve greater functionality from a device. A device having such configuration control would make it adaptable to unforeseen applications. For the same reason, there is a need to provide devices with the ability to perform conditional testing on data registers and configure itself according to the test results. In addition, there is a need to move certain device management responsibilities from an external CPU to such devices thereby lowering management processing overhead. There is also a need for a configuration loader that is flexible in its operation and allows a configurable device to have an expandable architecture.

SUMMARY

It is an object of the present invention to provide an effective system to control memory or register configuration without limitations to achieve greater functionality from a device. It is also an object of the present invention to provide devices with the ability to perform conditional testing on data registers and configure itself according to the test results. Another object of the present invention is to move certain device management responsibilities from an external CPU to such devices thereby lowering management processing overhead. It is also an object of the present invention to provide a configuration loader is flexible in its operation and allows a configurable device to have an expandable architecture.

In accordance with one embodiment of the present invention there is provided a configurable bus-master device including a configuration circuit in communication with a register. The configuration circuit tests the contents the register and stores data in accordance with the result of the test. The configuration circuit is also in communication with an internal bus. An interface circuit interfaces the internal bus and an external bus.

In accordance with another embodiment, the present invention provides a configurable bus-master device including an internal bus in communication with a register. The configuration circuit is also in communication with the internal bus. The configuration circuit tests a content of the register and stores data in accordance with the result of the test. An interface circuit interfaces the internal bus and an external bus.

In still another embodiment of the present invention, a method for configuring a configurable device is provided. The method provides steps for communicating with a register, testing the content the register, and storing data in accordance with the result of the test. The method further provides steps for communicating with an internal bus and interfacing the internal bus and an external bus.

DETAILED DESCRIPTION OF THE INVENTION

Various embodiments of the configuration loader according to the present invention will now be described in detail with reference to the accompanying drawings.

The present invention is a configuration loader which can perform conditional tests on registers and configure a bus-master device (e.g., network adapter) according to the test results. The configuration loader can adapt a device to different applications and take the role or part of the role of the software typically run on an operating system or an external programmable CPU. Such bus-master devices can be part of well known types of networks, such an 802.3 type network.

Figure 1:
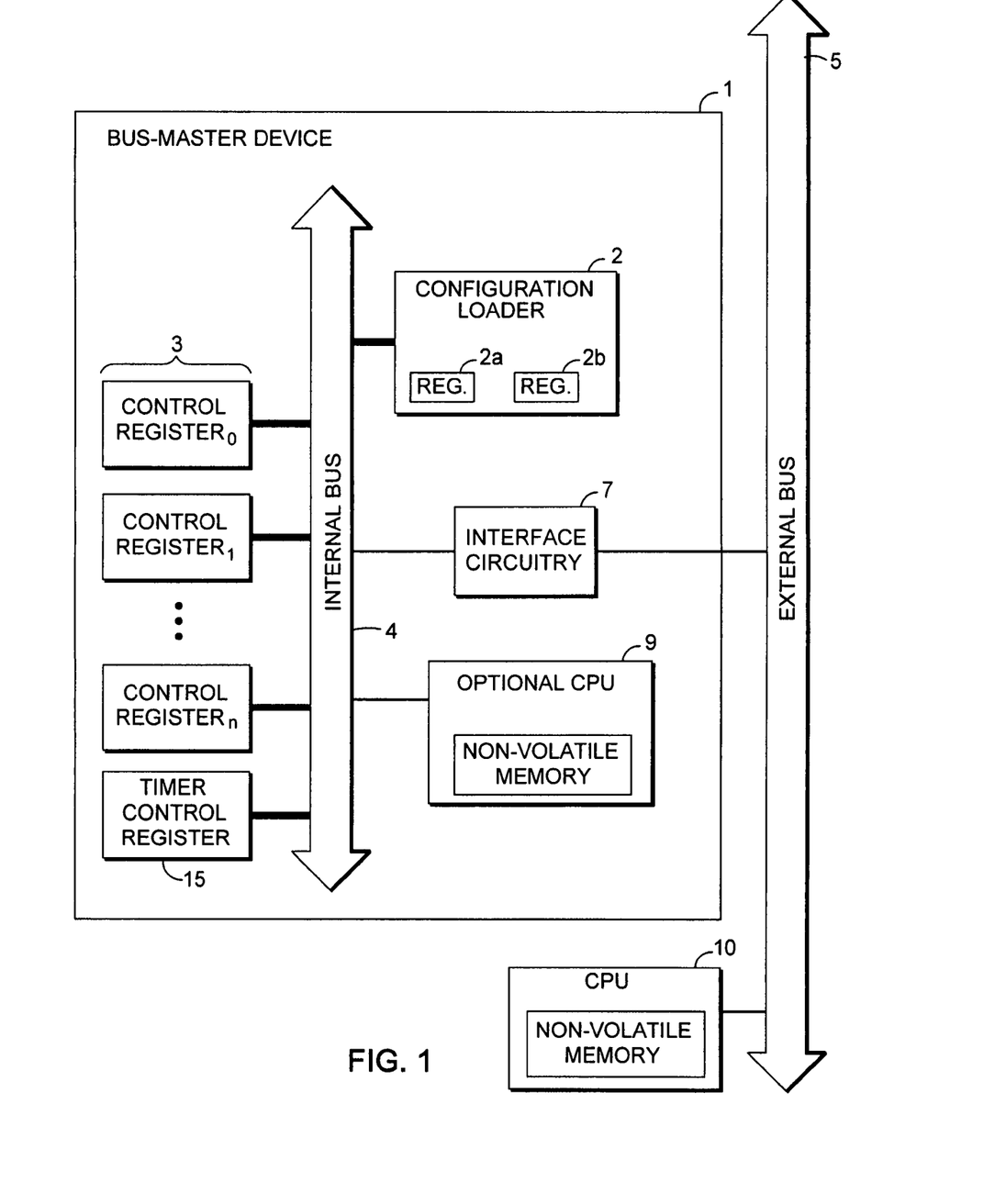
FIG. 1 is a block diagram of the present invention incorporated into a configurable device.

FIG. 1 is a block diagram of the present invention incorporated into a configurable device 1. The device 1 includes an internal bus 4 which is in communication with an external bus 5 via interface circuitry 7. The external bus 5 serves as a common connection for external device connected to the device 1. For example, a programmable CPU 10 can be on the external bus 5 and in communication with the device 1. The internal bus 4 serves as a common connection internal to the device 1, for connecting to sub-devices or circuitry. The internal bus 4 also is connected to various control registers 3. An optional on-board programmable CPU 9 also can be in communication with the internal bus 4 of the device.

Registers 3 hold data such as input/output ("I/O"), configuration and command data used by the sub-devices to perform application specific operations. A register 3 can be in the form of a storage space in memory or an electrical connection such as an interface pin connected to an external device.

A configuration loader 2 is communicatively connected to the internal bus 4 and may optionally include its own internal control registers 2a and 2b. The configuration loader controls how data is transferred to and from any register. In addition, the configuration loader has the capability to limit access to any register. The configuration loader also controls data uploads to internal or external non-volatile memory.

While the embodiments discussed herein use external busses to communicate with external source devices, these busses could be replaced by network connections. In addition, it should be noted that interface circuitry described herein refers to any shared boundary between two functional entities, which can be part of device 1, external to it, or a combination of both, the constructions of which are well known. The present invention can be constructed onto a single die. Of course, separate dies can be used instead. For example, the memory can be on the same die as the configuration loader or on an entirely separate die.

I/O data, command data, or any other data for commanding, controlling and testing as described herein is collectively referred to as control data. It should be understood however that configuration data can also carry control data and vice versa. For example, the configuration data can include a test commands to be stored in a sub-device. This data (i.e., configuration data) can be used by the configuration loader as control data to perform particular tests.

In the above-described embodiment, data originates from the programmable CPU 10 on external bus 5. However, data can originate from any source device.

Figure 2:
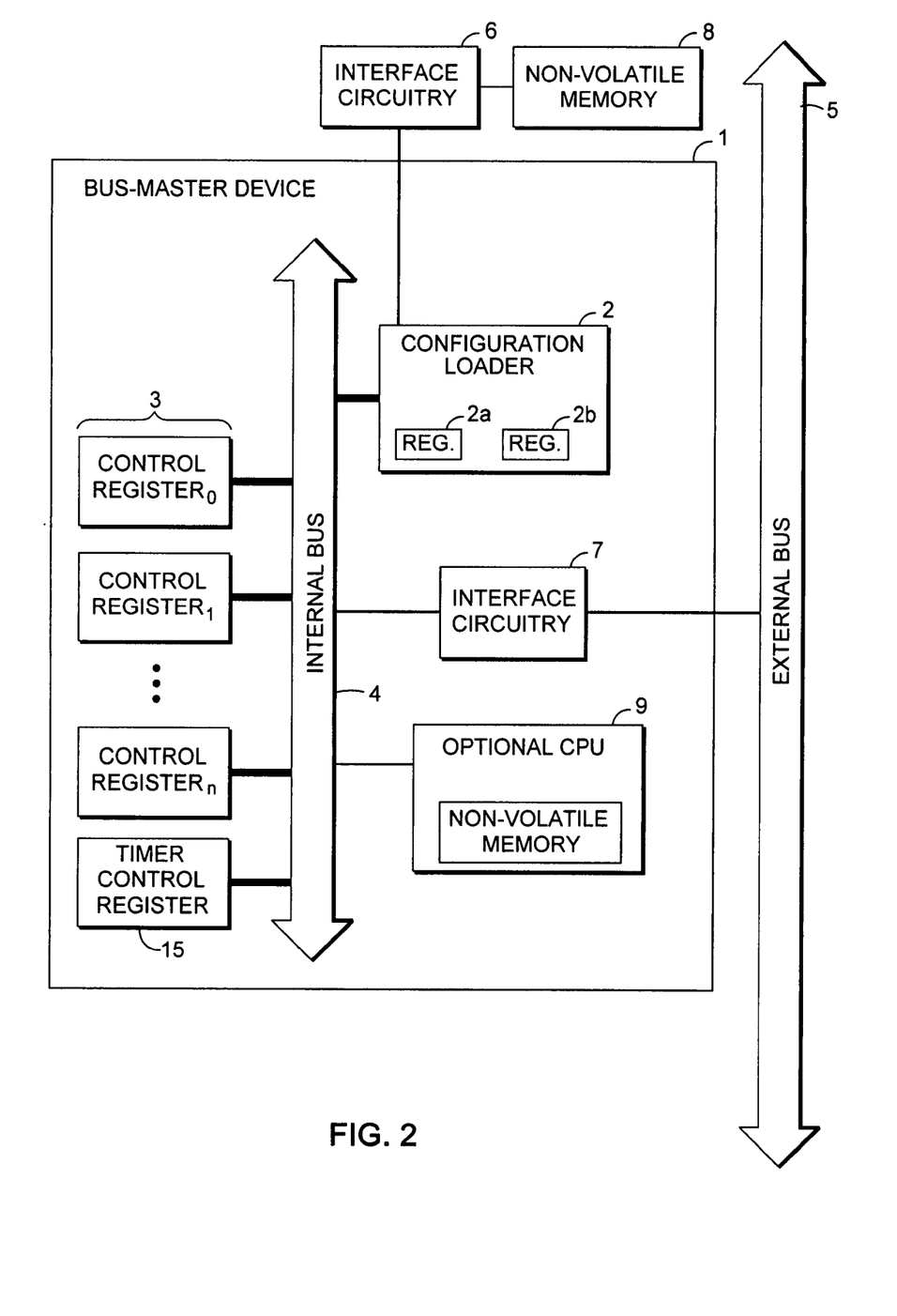
FIG. 2 illustrates an embodiment of the present invention in which a non-volatile memory is in communication with a configuration loader via interface circuitry.

FIG. 2 illustrates an embodiment of the present invention in which a non-volatile memory 8 is in communication with a configuration loader 2 via interface circuitry. External memory 8 is communicatively coupled directly to the configuration loader via interface circuitry 6. Data can be transmitted to or from memory 8 and the registers throughout the device 1 and vice versa. The remaining elements shown in FIG. 2 are the same as those discussed above with respect to FIG. 1.

Figure 3:
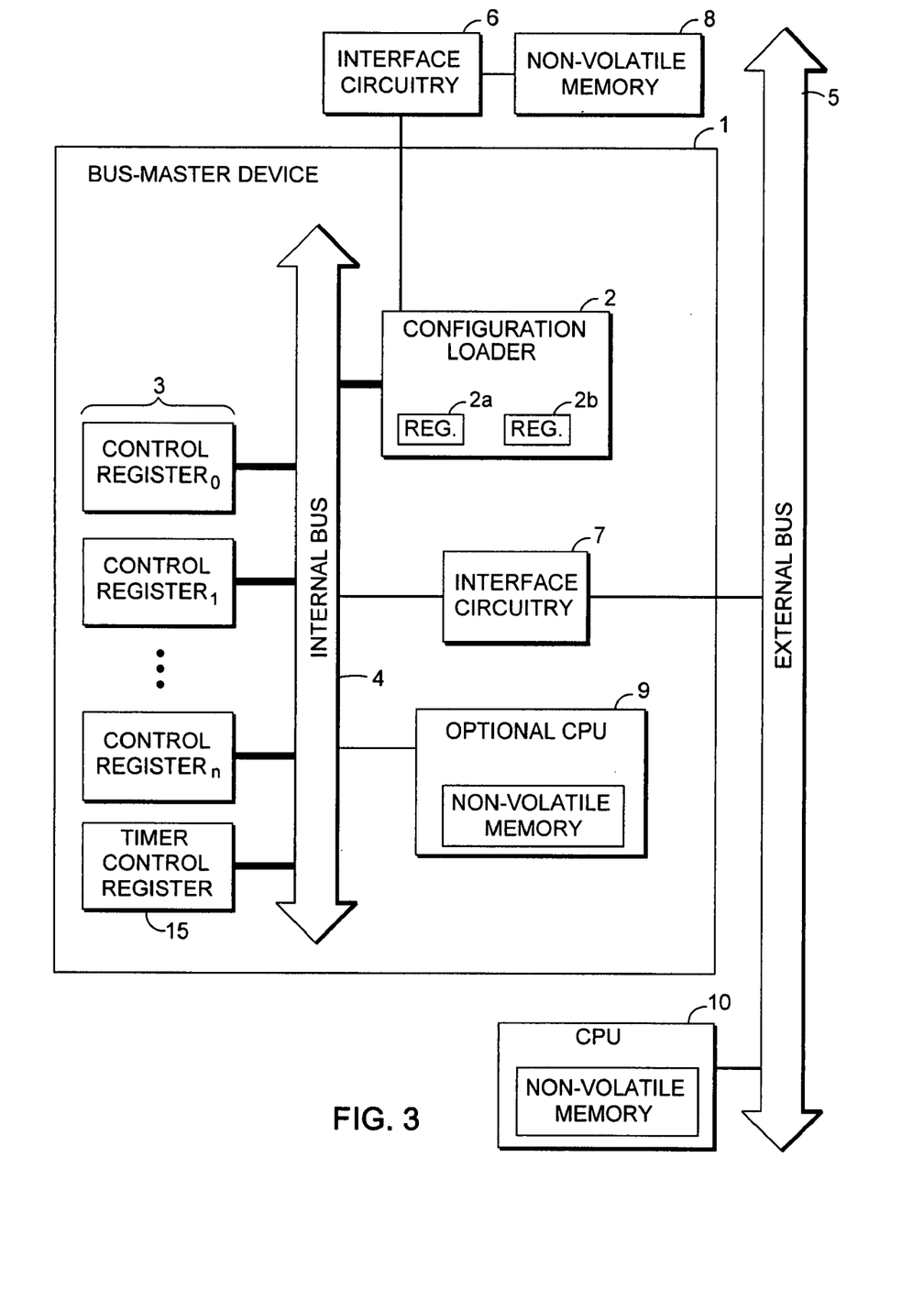
FIG. 3 illustrates a combination of the embodiments discussed above in connection with FIGS. 1 and 2.

FIG. 3 illustrates another embodiment of the present invention. This embodiment is a combination of the embodiments discussed above in connection with FIGS. 1 and 2. In this embodiment, data can be loaded from external memory 8 to certain device registers before the external CPU 10 initializes (i.e., boots up). This allows the configuration loader to customize device registers for particular applications before the device communicates with the external CPU 10. For example, specific chip vendor or device identification registers can be loaded from non-volatile memory when the device turns on—before an external CPU it is coupled to is turned on (or before a link with the external CPU is up). After the programmable CPU 10 is turned on (or after the link between the device 1 and the CPU 10 is up), additional data can be transferred, where the additional data is selected based on the content of the customized device registers.

Figure 4:
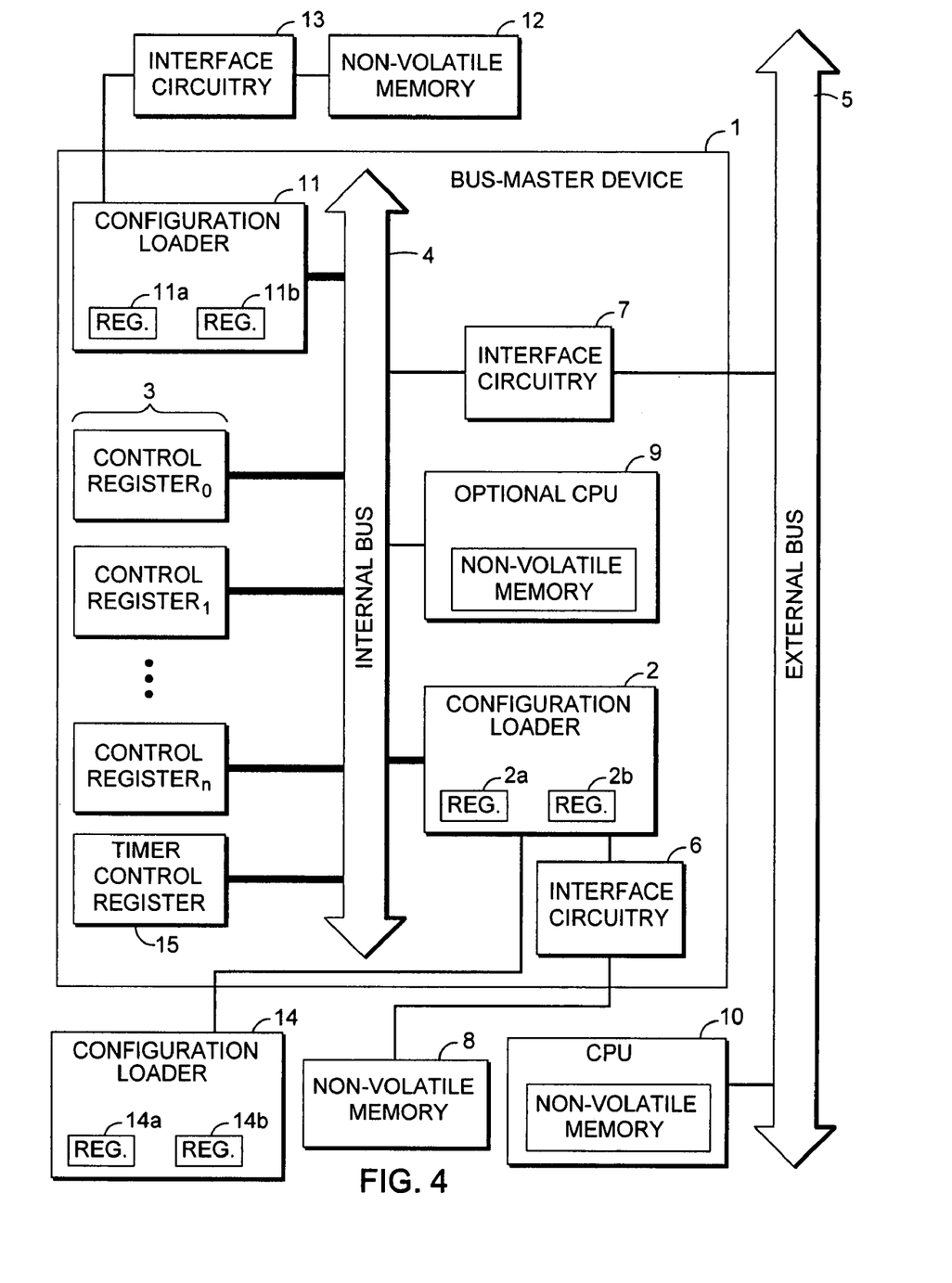
FIG. 4 illustrates another embodiment which expands on the embodiments discussed above in connection with FIGS. 1, 2 and 3.

FIG. 4 illustrates another embodiment which expands on the embodiments discussed above in connection with FIGS. 1, 2 and 3. This embodiment provides multiple configuration loaders 2, 11 and 14, which are configured in different ways. Configuration loaders 2 and 14 are cascaded in a sequence and Configuration loaders 2 and 11 are communicatively coupled via the internal bus 4. In addition, a configuration loader can be outside the device 1 as is configuration loader 14. Configuration loader 14 may be part of another device having corresponding memory, internal or external busses, network connections, CPU and the like.

The configuration loaders can act independently or control each other each having access to the others internal registers 2a, 2b, 11a, 11b, 14a, and/or 14b. A configuration loader can be brought to a specific state upon receiving a command (or message) from another configuration loader. This allows one loader to be a master loader that starts first and the others to be redundant configuration loaders, which start one after the other as soon as the previous loader in the sequence has finished. Any loader can prevent the following loaders from starting. In addition, any loader can restart the other loader(s) or even itself.

A configuration loader can have exclusive control of the internal bus 4. This allows the configuration loader the ability to assure that the device is configured correctly before other external or internal accesses to the internal bus 4 take place (e.g., by CPU 9 or CPU 10).

Each of the embodiments described above includes a configuration loader which can adapt a device to different applications as powerfully as if the device were controlled by external software implemented on a CPU. In addition, data can be automatically loaded to registers from non-volatile memory during or after initialization.

Before loading data onto the device, a configuration loader can perform a test(s) on any registers or i/o. Based on the results of the tests, the configuration loader determines what operation is performed next. Such testing provides flexibility as to the device's next course of action.

CPUs 9 and 10 or even a configuration loader can communicate a configuration start command by modifying the contents of a particular register. A configuration loader can be configured to monitor (e.g., test) the particular register and start a configuration process based on the content of the register. Additionally, a configuration loader can be started via a hardware event such as a reset or power state change.

In some cases the configuration loader may need to delay a certain operation for a specific time. One feature of the present invention is that it can load a time into a timer control register, such as timer control register 15. When the timer expires, the configuration loader can then jump to a different operation. Notification to the configuration loader that the timer has expired can be through well known polling or interrupt driven techniques.

A practical example illustrating the above-mentioned features of the present invention will now be described. At any given time, the configuration loader may be commanded to test a particular sub-device's power-state status bit. If the test concludes that the sub-device is in a standby state, the configuration loader can send a wake-up command to that sub-device. The sub-device might not be able to initialize immediately, however, for various reasons (e.g., the sub-device needs to initialize). Rather than wait and waste valuable processing time, the configuration loader instead sets a timer in one of its control registers and performs other operations. When the timer expires, the configuration loader will jump back to configuring the sub-device.

The conditional test commands originate from various places. Commands can be fetched from external memory 8 during an initial data configuration upload, a subsequent upload, or can be preloaded into the device's programmed CPU 9. The commands can also be stored in the device's on-board non-volatile memory or any register 2a, 2b or 3. Alternatively, the conditional tests can be in the form of commands processed by the CPU 9.

Figure 5A:
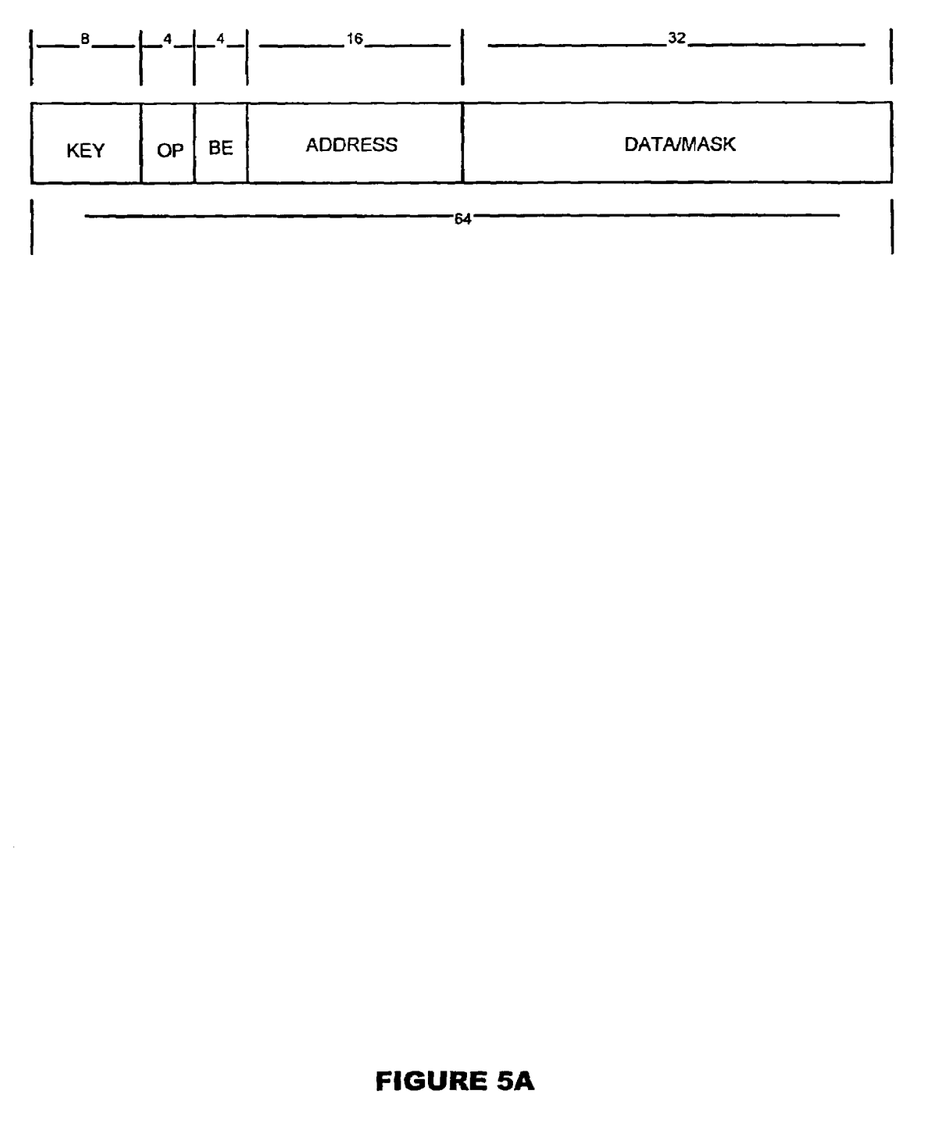
FIG. 5A shows an exemplary format of a data structure the configuration loader uses for controlling configuration operations.

FIG. 5A shows an exemplary format of a data structure the configuration loader uses for controlling configuration operations. In particular, the data structure shown provides read/write and conditional test control. Single or consecutive portions of the data structure can be fetched. For example, data can be accessed or written one byte, word or dword at a time. This allows data to be transferred within one single burst through a sequential data load.

The particular fields of the data structure are defined as follows. Other data formats (and bit sizes) can be used and still be within the scope of the invention. Indeed, formats will vary depending on the type of external device or memory from which data is retrieved as well as depend on the particular interfaces used (e.g., parallel, serial, network, optical, radio frequency ("RF") to name a few). The "Key" field is an 8-bit unique value used to validate data as configuration data. The "Opcode" field is a 4-bit value used to determine the kind of operation to be performed by the configuration loader (e.g., read, write, bit test, etc.). The "Byte Enable" field is a 4-bit value used to determine which byte(s) in a 32-bit register location shall be overwritten. The "Address" field is a 16-bit address value identifying the register location to write, or on which to perform conditional testing. The "Data/Mask" field is a 32-bit value including write data for write operations or a 32-bit mask. A mask is a pattern of bits that can be used to retain or suppress segments of another pattern of bits. The mask is used to identify specific bits of a register or i/o port on which to perform the conditional testing operations.

Figure 5B:
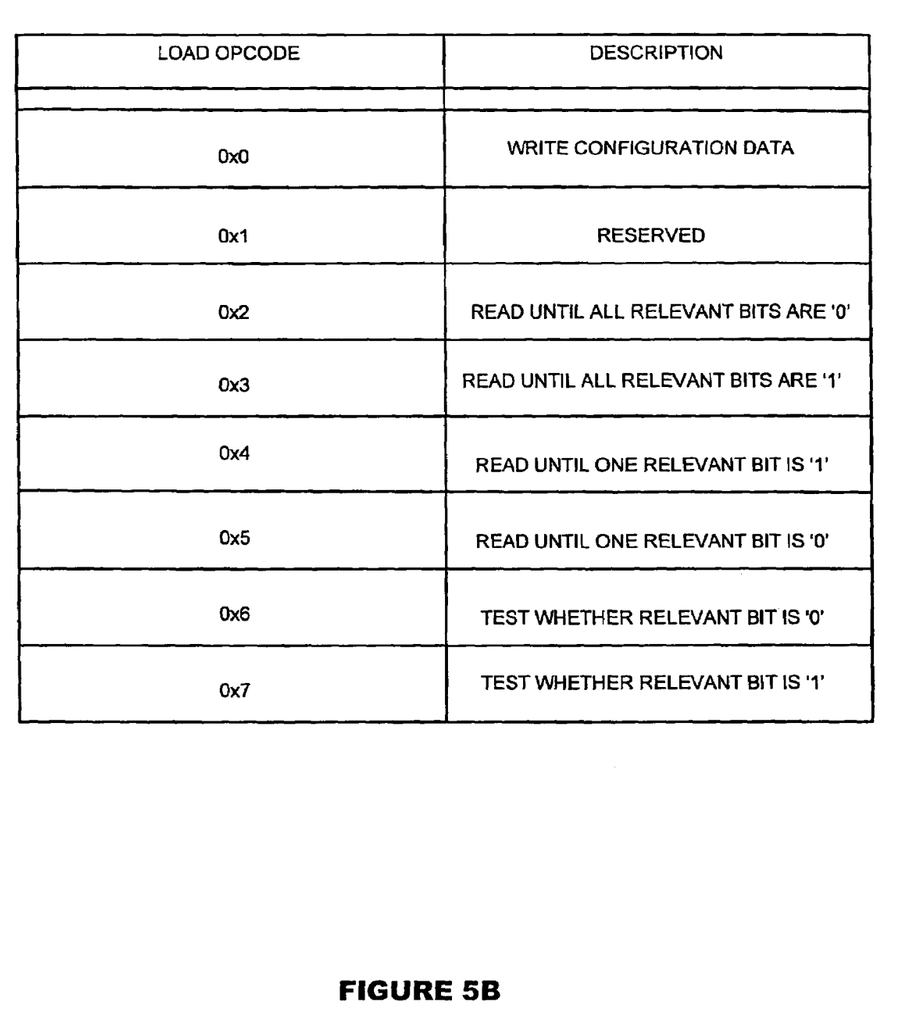
FIG. 5B lists exemplary opcodes in accordance with the data format discussed above with respect to FIG. 5A.

FIG. 5B lists exemplary opcodes in accordance with the data format discussed above with respect to FIG. 5A. The number of possible opcodes (and hence operations) is practically limitless and is merely a design choice. An opcode of 0x0 is a command to write configuration data. Opcodes of 0x1 is reserved for new opcodes. Opcodes 0x2, 0x3, 0x4 and 0x5 are bit-test commands which perform operations in accordance with register bit values. As explained above, the specific bit(s) to be tested are identified by addressing a register using the "Address" data and by masking the "Data/Mask" value. An opcode of 0x2, for example, commands the configuration loader to read a particular bit (or set of bits) until they are equal to "0". An opcode of 0x3 will read a bit (or bits) until they are all equal to "1". An opcode of 0x4 or 0x5 will read all the relevant bits until at least one is "1" or "0", respectively. Opcodes of 0x6 and 0x7 test a particular bit (or set of bits) for "0" or "1", respectively.

The next action taken by a configuration loader depends on the result of a test. For example, a vendor may be provided the ability to hardwire one or more bits. Depending on the hardwire configuration, the test above would cause a corresponding action. An action may be as simple as turning on a light on the device. Another example might be to jump to another register and load that register with data, thereby redirecting configuration, command and/or other data.

Register bits can be monitored. For example, a bit in a sub-device's corresponding register can be configured to monitor the power state of the sub-device. If the power state of the sub-device changes, the value of the bit changes. The configuration loader upon testing the sub-device's bit and determining that the device has failed, can modify the way in which configuration data is transferred.

The sequence in which data is configured can change during a configuration process, eliminating the need to load the external memory in a specific manner a priori. If a sub-device is busy for instance, the configuration loader can jump to a different address in non-volatile memory to fetch data corresponding to another sub-device. After the corresponding registers have been loaded, the configuration loader can test a status bit to determine if the first sub-device is back up and if so jump back to loading its registers. This can be accomplished by simply storing the non-volatile memory address corresponding to the "busy" or "downed" device in a control register (e.g., register 2a) and writing in another control register (e.g., register 2b) the sequence in which to perform subsequent tests.

Various other tests and operations can be incorporated into the configuration loader, providing a very flexible configuration loader, which in turn provides greater functionality to the device. For example the configuration loader can monitory a message register which waits for a message which commands the loader to begin a configuration process. The command message could be received from a remote device on a network to an external CPU, where the CPU is in communication with the configuration loader.

Similarly, a sub-device register accessible to the configuration loader can receive the same type of message, without the need for a network connection.

Figure 6:
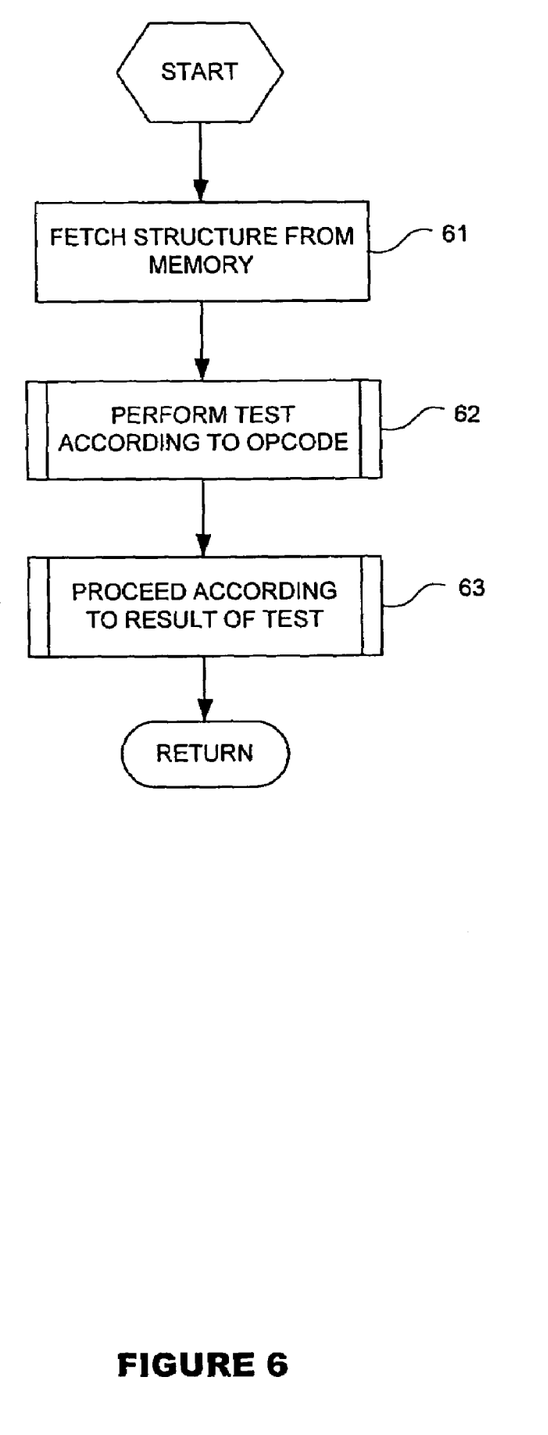
FIG. 6 is a flowchart of a routine in accordance with the present invention.

FIG. 6 is a flowchart of a routine in accordance with the present invention. As explained above, the configuration loader can perform configuration at device initialization and during device operation. At step 61, a data structure is read from an internal or external memory or register.

The configuration loader performs a test on a register in accordance with an opcode data element at step 62. At step 63, an operation is performed in accordance with the result of the test. As described above, the number of different operations is a design choice. This allows the resulting device to be optimized for a targeted application domain but and yet remain programmable. With the present invention the device can be configured to run any application in that domain.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A configurable bus-master device, comprising:
    at least one configuration circuit in communication with at least one register and adapted to test a content of the at least one register and store data in accordance with the result of the test, the configuration circuit in communication with an internal bus;
    an interface circuit adapted to interface the internal bus and an external bus; and
        a timer adapted to provide a timer signal to the configuration circuit at the end of a predetermined interval of time,
        wherein the configuration circuit is constructed to test the content upon receiving the timer signal.

2. A configurable bus-master device according to claim 1, further comprising:
    a programmable CPU in communication with the internal bus.

3. A configurable bus-master device according to claim 1, wherein the data is at least one of a control and configuration type data.

4. A configurable bus-master device according to claim 1, wherein the data includes an opcode field and a mask field, and wherein the opcode field contains a type of test for the at least one configuration circuit to perform and the mask field contains at least one register bit of the at least one register on which to perform the test.

5. A configurable bus-master device according to claim 1, wherein the data includes an address field and a data field, wherein the address field contains an address and the data field contains configuration data, wherein the configuration circuit stores the configuration data in accordance with the address.

6. A configurable bus-master device according to claim 1, wherein the at least one configuration circuit obtains the data from a storage device.

7. A configurable bus-master device according to claim 6, wherein at least one of a location and a destination of the data is stored in the storage device.

8. A configurable bus-master device according to claim 1, wherein at least one of a location and a destination of the data is stored in another one of the registers.

9. A configurable bus-master device according to claim 1, wherein the timer is further adapted to start or stop the test at a predetermined time.

10. A configurable bus-master device according to claim 1, wherein the data is stored in a storage device.

11. A configurable bus-master device according to claim 1, wherein the data is stored in the at least one register.

12. A configurable bus-master device according to claim 1, wherein the at least one configuration circuit is further adapted to control access to the internal bus.

13. A configurable bus-master device according to claim 1, wherein the at least one configuration circuit is further adapted to control access to the registers.

14. A configurable bus-master device according to claim 1, wherein the bus-master device is a network adapter on an 802.3 network.

15. A configurable bus-master device according to claim 1, wherein the internal bus is in communication with at least one other register.

16. A configurable bus-master device according to claim 15, wherein the at least one configuration circuit is further adapted to test a content of the at least one other register and store the data in accordance with the result of the test.

17. A configurable bus-master device according to claim 15, wherein the at least one configuration circuit is further adapted to store the data in the at least one other register.

18. A configurable bus-master device according to claim 1, wherein the at least one configuration circuit, the at least one register and the internal bus are constructed on at least one die.

19. A configurable bus-master device according to claim 1, wherein the at least one configuration circuit, the at least one register, the internal bus, and a storage device are constructed on at least one die.

20. A network computer system, comprising:
    the configurable bus-master device of claim 1.

21. A configurable bus-master device according to claim 1, wherein before receipt of the timer signal, said configuration circuit performs other operations.

22. A configurable bus-maser device according to claim 1, wherein said configuration circuit has exclusive control of the interval bus.

23. A configurable bus-master device, comprising:
    an internal bus in communication with at least one register;
    at least one configuration circuit in communication with the internal bus and adapted to test a content of the at least one register and store data in accordance with the result of the test;
    an interface circuit adapted to interface the internal bus and an external bus; and
    a timer adapted to provide a timer signal to the configuration circuit at the end of a predetermined interval of time; and
    wherein the configuration circuit is constructed to test the content upon receiving the timer signal.

24. A configurable bus-master device according to claim 23, further comprising:
    a programmable CPU in communication with the internal bus.

25. A configurable bus-master device according to claim 23, wherein the data is at least one of a control and configuration type data.

26. A configurable bus-master device according to claim 23, wherein the data includes an opcode field and a mask field, and wherein the opcode field contains a type of test for the at least one configuration circuit to perform and the mask field contains at least one register bit of the at least one register on which to perform the test.

27. A configurable bus-master device according to claim 23, wherein the data includes an address field and a data field, wherein the address field contains an address and the data field contains configuration data, wherein the configuration circuit stores the configuration data in accordance with the address.

28. A configurable bus-master device according to claim 23, wherein the at least one configuration circuit obtains the data from a storage device.

29. A configurable bus-master device according to claim 28, wherein at least one of a location and a destination of the data is stored in the storage device.

30. A configurable bus-master device according to claim 23, wherein at least one of a location and a destination of the data is stored in another one of the registers.

31. A configurable bus-master device according to claim 23, wherein the timer is further adapted to start or stop the test at a predetermined time.

32. A configurable bus-master device according to claim 23, wherein the data is stored in a storage device.

33. A configurable bus-master device according to claim 23, wherein the data is stored in the at least one register.

34. A configurable bus-master device according to claim 23, wherein the at least one configuration circuit is further adapted to control access to the internal bus.

35. A configurable bus-master device according to claim 23, wherein the at least one configuration circuit is further adapted to control access to the registers.

36. A configurable bus-master device according to claim 23, wherein the bus-master device is a network adapter on an 802.3 network.

37. A configurable bus-master device according to claim 23, wherein
the at least one configuration circuit is in communication with at least one configuration circuit register.

38. A configurable bus-master device according to claim 37, wherein the at least one configuration circuit is further adapted to test a content of the at least one configuration circuit register and store the data in accordance with the result of the test.

39. A configurable bus-master device according to claim 37, wherein the at least one configuration circuit is further adapted to store the data in the at least one configuration circuit register.

40. A configurable bus-master device according to claim 23, wherein the at least one configuration circuit, the at least one configuration circuit register and the internal bus are constructed on at least one die.

41. A configurable bus-master device according to claim 23, wherein the at least one configuration circuit, the at least one register, the internal bus, and a storage device are constructed on at least one die.

42. A network computer system, comprising:
the configuration bus-master device of claim 23.

43. A configurable bus-master device according to claim 23, wherein before receipt of the timer signal, said configuration circuit performs other operations.

44. A configurable bus-maser device according to claim 23, wherein said configuration circuit has exclusive control of the interval bus.

45. A configurable bus-master device, comprising:
at least one configuration circuit in communication with at least one register and adapted to test a content of the at least one register and store data in accordance with the result of the test, the configuration circuit in communication with an internal bus;
an interface circuit adapted to interface the internal bus and an external bus; and
a timer constructed to provide a timer signal to the configuration circuit at the end of a predetermined interval of time,
wherein the configuration circuit is constructed to store the data upon receiving the timer signal.

46. A configurable bus-master device according to claim 45, further comprising:
a programmable CPU in communication with the internal bus.

47. A configurable bus-master device according to claim 45, wherein the data is at least one of a control and configuration type data.

48. A configurable bus-master device according to claim 45, wherein the data includes an opcode field and a mask field, and wherein the opcode field contains a type of test for the at least one configuration circuit to perform and the mask field contains at least one register bit of the at least one register on which to perform the test.

49. A configurable bus-master device according to claim 45, wherein the data includes an address field and a data field, wherein the address field contains an address and the data field contains configuration data, wherein the configuration circuit stores the configuration data in accordance with the address.

50. A configurable bus-master device according to claim 45, wherein the at least one configuration circuit obtains the data from a storage device.

51. A configurable bus-master device according to claim 50, wherein at least one of a location and a destination of the data is stored in the storage device.

52. A configurable bus-master device according to claim 45, wherein at least one of a location and a destination of the data is stored in another one of the registers.

53. A configurable bus-master device according to claim 45, wherein the timer is further adapted to start or stop the test at a predetermined time.

54. A configurable bus-master device according to claim 45, wherein the data is stored in a storage device.

55. A configurable bus-master device according to claim 45, wherein the data is stored in the at least one register.

56. A configurable bus-master device according to claim 45, wherein the at least one configuration circuit is further adapted to control access to the internal bus.

57. A configurable bus-master device according to claim 45, wherein the at least one configuration circuit is further adapted to control access to the registers.

58. A configurable bus-master device according to claim 45, wherein the bus-master device is a network adapter on an 802.3 network.

59. A configurable bus-master device according to claim 45, wherein the internal bus is in communication with at least one other register.

60. A configurable bus-master device according to claim 59, wherein the at least one configuration circuit is further adapted to test a content of the at least one other register and store the data in accordance with the result of the test.

61. A configurable bus-master device according to claim 59, wherein the at least one configuration circuit is further adapted to store the data in the at least one other register.

62. A configurable bus-master device according to claim 45, wherein the at least one configuration circuit, the at least one register and the internal bus are constructed on at least one die.

63. A configurable bus-master device according to claim 45, wherein the at least one configuration circuit, the at least one register, the internal bus, and a storage device are constructed on at least one die.

64. A network computer system, comprising:
the configurable bus-master device of claim 45.

65. A configurable bus-master device according to claim 45, wherein before receipt of the timer signal, said configuration circuit performs other operations.

66. A configurable bus-maser device according to claim 45, wherein said configuration circuit has exclusive control of the interval bus.

67. A configurable bus-master device, comprising:
an internal bus in communication with at least one register;
at least one configuration circuit in communication with the internal bus and adapted to test a content of the at least one register and store data in accordance with the result of the test;
an interface circuit adapted to interface the internal bus and an external bus; and
a timer constructed to provide a timer signal to the configuration circuit at the end of a predetermined interval of time,
wherein the configuration circuit is constructed to store the data upon receiving the timer signal.

68. A configurable bus-master device according to claim 67, further comprising:
a programmable CPU in communication with the internal bus.

69. A configurable bus-master device according to claim 67, wherein the data is at least one of a control and configuration type data.

70. A configurable bus-master device according to claim 67, wherein the data includes an opcode field and a mask field, and wherein the opcode field contains a type of test for the at least one configuration circuit to perform and the mask field contains at least one register bit of the at least one register on which to perform the test.

71. A configurable bus-master device according to claim 67, wherein the data includes an address field and a data field, wherein the address field contains an address and the data field contains configuration data, wherein the configuration circuit stores the configuration data in accordance with the address.

72. A configurable bus-master device according to claim 67, wherein the at least one configuration circuit obtains the data from a storage device.

73. A configurable bus-master device according to claim 72, wherein at least one of a location and a destination of the data is stored in the storage device.

74. A configurable bus-master device according to claim 67, wherein at least one of a location and a destination of the data is stored in another one of the registers.

75. A configurable bus-master device according to claim 67, wherein the timer is further adapted to start or stop the test at a predetermined time.

76. A configurable bus-master device according to claim 67, wherein the data is stored in a storage device.

77. A configurable bus-master device according to claim 67, wherein the data is stored in the at least one register.

78. A configurable bus-master device according to claim 67, wherein the at least one configuration circuit is further adapted to control access to the internal bus.

79. A configurable bus-master device according to claim 67, wherein the at least one configuration circuit is further adapted to control access to the registers.

80. A configurable bus-master device according to claim 67, wherein the bus-master device is a network adapter on an 802.3 network.

81. A configurable bus-master device according to claim 67, wherein
the at least one configuration circuit is in communication with at least one configuration circuit register.

82. A configurable bus-master device according to claim 81, wherein the at least one configuration circuit is further adapted to test a content of the at least one configuration circuit register and store the data in accordance with the result of the test.

83. A configurable bus-master device according to claim 81, wherein the at least one configuration circuit is further adapted to store the data in the at least one configuration circuit register.

84. A configurable bus-master device according to claim 67, wherein the at least one configuration circuit, the at least one configuration circuit register and the internal bus are constructed on at least one die.

85. A configurable bus-master device according to claim 67, wherein the at least one configuration circuit, the at least one register, the internal bus, and a storage device are constructed on at least one die.

86. A network computer system, comprising:
the configuration bus-master device of claim 67.

87. A configurable bus-master device according to claim 67, wherein before receipt of the timer signal, said configuration circuit performs other operations.

88. A configurable bus-maser device according to claim 67, wherein said configuration circuit has exclusive control of the interval bus.

* * * * *

UNITED STATES PATENT AND TRADEMARK OFFICE
CERTIFICATE OF CORRECTION

PATENT NO. : 7,266,680 B1  Page 1 of 1
APPLICATION NO. : 10/901689
DATED : September 4, 2007
INVENTOR(S) : Lukas Reinbold It is certified that error appears in the above-identified patent and that said Letters Patent is hereby corrected as shown below:

Column 8
Line 44, "A configurable bus-maser..." should read --A configurable bus-master...--.

Column 9
Line 65, "A configurable bus-maser..." should read --A configurable bus-master...--.

Column 11
Line 14, "A configurable bus-maser..." should read --A configurable bus-master...--.

Column 12
Line 51, "A configurable bus-maser..." should read --A configurable bus-master...--.

Signed and Sealed this

Seventeenth Day of March, 2009

JOHN DOLL
*Acting Director of the United States Patent and Trademark Office*